United States Patent
Homewood et al.

(10) Patent No.: US 10,941,589 B1
(45) Date of Patent: Mar. 9, 2021

(54) LOCK

(71) Applicant: AMSAFE BRIDPORT LIMITED, Bridport (GB)

(72) Inventors: James Barry Homewood, Bridport (GB); Timothy David Pollock, Bridport (GB)

(73) Assignee: AMSAFE BRIDPORT LIMITED, Bridport (GB)

( * ) Notice: Subject to any disclaimer, the term of this patent is extended or adjusted under 35 U.S.C. 154(b) by 0 days.

(21) Appl. No.: 16/911,120

(22) Filed: Jun. 24, 2020

(30) Foreign Application Priority Data

Sep. 24, 2019 (EP) .................................... 19199407

(51) Int. Cl.
  *E05B 65/00* (2006.01)
  *B64C 1/14* (2006.01)
  *B64C 1/00* (2006.01)

(52) U.S. Cl.
  CPC ............ *E05B 65/00* (2013.01); *B64C 1/1469* (2013.01); *B64C 2001/009* (2013.01)

(58) Field of Classification Search
  CPC ............ B64C 1/1469; B64C 2001/009; B64D 45/0015; B64D 11/00; B64D 11/0023; E05B 17/0041; E05B 2015/0448; E05B 2043/007; E05B 47/0038; E05B 65/1086; E05B 2047/0086; E05B 65/108; E05B 77/42; E05Y 2900/502; E05Y 2800/252; E05Y 2900/531
  See application file for complete search history.

(56) References Cited

U.S. PATENT DOCUMENTS

| 7,255,376 B2 * | 8/2007 | Pratt ..................... B64C 1/1469 244/129.4 |
| 2003/0066930 A1 * | 4/2003 | Pratt ..................... E05B 51/023 244/118.5 |
| 2003/0090113 A1 * | 5/2003 | Piorkowski ............... E05C 1/16 292/139 |
| 2004/0046084 A1 * | 3/2004 | Brzeski ................. B64C 1/1469 244/129.5 |
| 2006/0000946 A1 | 1/2006 | Garofani et al. |

(Continued)

FOREIGN PATENT DOCUMENTS

| EP | 2 390 445 A2 | 11/2011 |
| EP | 3 670 328 A1 | 6/2020 |

(Continued)

OTHER PUBLICATIONS

Mar. 30, 2020 extended Search Report issued in European Patent Application No. 19199407.8.

(Continued)

*Primary Examiner* — Mark A Williams
(74) *Attorney, Agent, or Firm* — Oliff PLC

(57) ABSTRACT

A lock is provided for a secondary aircraft cockpit barrier. The lock has a locking tongue, a cavity for receiving the locking tongue, a locking retainer for retaining the locking tongue in the cavity, and a damped locking tongue releasing mechanism for releasing the locking retainer thereby unlocking the locking tongue from the cavity. The damped locking tongue releasing mechanism is damped such that releasing the locking retainer requires at least about 5 seconds.

12 Claims, 2 Drawing Sheets

(56) References Cited

U.S. PATENT DOCUMENTS

| | | | |
|---|---|---|---|
| 2009/0118876 A1* | 5/2009 | Yadollahi | ............. E05B 51/023 |
| | | | 701/14 |
| 2012/0167644 A1* | 7/2012 | Berger | ................ E05B 47/0603 |
| | | | 70/144 |
| 2018/0265216 A1 | 9/2018 | Breigenzer | |

FOREIGN PATENT DOCUMENTS

| | | |
|---|---|---|
| GB | 2 049 020 A | 12/1980 |
| WO | 03/029585 A2 | 4/2003 |
| WO | 03/029591 A2 | 4/2003 |

OTHER PUBLICATIONS

Nov. 19, 2020 International Search Report issued in International Patent Application No. PCT/GB2020/052308.

Nov. 19, 2020 Written Opinion issued in International Patent Application No. PCT/GB2020/052308.

* cited by examiner

LOCK

This U.S. application claims priority to European Patent Application No. 19199407, filed Sep. 24, 2019, and the contents of that prior application are incorporated herein by reference in their entirety.

The invention relates to a lock, in particular to a lock for a secondary cockpit barrier, and a secondary cockpit barrier comprising the same and a barrier body for blocking access to an aircraft cockpit.

The toilet facilities provided for pilots in modern aircraft are generally sited adjacent the flight deck but with no direct access from the flight deck requiring the pilot to egress the flight deck to avail themselves of the facilities. Given the proximity of passenger seating to the aircraft flight deck door, there is a risk that a passenger may attempt to force entry onto the flight deck when the aircraft is airborne as the pilot steps to and from the flight deck for a toilet break. In order to mitigate this risk, access to the flight deck door is blocked by a flight attendant often with an in-flight service trolley. However this places the flight attendant in danger and thus there is a need for a physical barrier device to protect the flight deck door. In particular, the ability to delay an attempted breach of the flight deck door by at least 5 seconds is required. Thus if a passenger attempts to open the physical barrier device whilst the flight deck door is open, it will take them at least 5 seconds in order to unlock the barrier device.

SUMMARY OF THE INVENTION

In a first aspect of the invention, a lock for a secondary aircraft cockpit barrier is provided, the lock comprising a locking tongue, a cavity for receiving the locking tongue, a locking retainer for retaining the locking tongue in the cavity, and a damped locking tongue releasing mechanism for releasing the locking retainer thereby unlocking the locking tongue from the cavity, wherein the damped locking tongue releasing mechanism is damped such that releasing the locking retainer requires at least about 5 seconds.

In a second aspect of the invention, a barrier, such as a secondary aircraft cockpit barrier, is provided, the barrier comprising a lock according to the first aspect of the invention and a barrier body for blocking access to the cockpit, wherein the locking tongue is operably attached to the barrier body such that the barrier body blocks access to the cockpit when the locking retainer retains the locking tongue in the cavity.

The barrier can optionally be retrofitted to existing aircraft as well as fitted during construction of new aircraft. Typically the cockpit barrier is fitted in the galley-toilet area adjacent the access to the flight deck, the lock (save the locking tongue) on one side of the access to the flight deck from the galley, and the barrier body and locking tongue sited on the opposing (horizontal) side of the access to the flight deck from the galley whereby, in use, the barrier body is pulled (horizontally) across the access and locked in place by the lock. In this embodiment, the barrier is known as a secondary aircraft cockpit barrier. An alternative arrangement of secondary aircraft cockpit barrier involves fitting the lock (save the locking tongue), and the barrier body and locking tongue on either side of the access to the flight deck from the galley, the lock (save the locking tongue) can be fitted on the floor of the access to the flight deck from the galley, and the barrier body and locking tongue fitted to the ceiling of the access to the flight deck from the galley and, in use, pulled down to meet and be locked in the lock. One advantage of the fitting the secondary aircraft cockpit barrier to the floor and ceiling is that this arrangement uses otherwise unused space in the ceiling void. In contrast, when fitted to either side of the access to the flight deck from the galley, the width of the access is further constricted.

Rather than being used as a cockpit barrier, the barrier can optionally also be fitted between different classes of seats in a commercial passenger aircraft in the galley areas which separate the different seat classes and operated in the same way as described hereinabove and below.

BRIEF DESCRIPTION OF THE FIGURES

The invention is illustrated with reference to the following Figures which show in.

DETAILED DESCRIPTION OF THE INVENTION

Figure 1A:
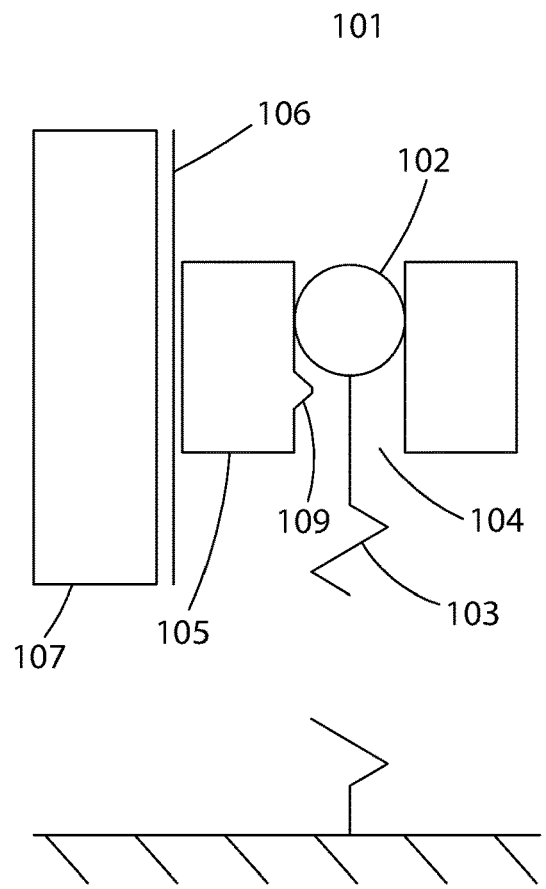
FIGS. 1A and 1B horizontal and vertical cross-sections of one embodiment of the barrier of the invention.

In a first aspect of the invention, a lock for a secondary aircraft cockpit barrier is provided, the lock comprising a locking tongue, a cavity for receiving the locking tongue, a locking retainer for retaining the locking tongue in the cavity, and a damped locking tongue releasing mechanism for releasing the locking retainer thereby unlocking the locking tongue from the cavity, wherein the damped locking tongue releasing mechanism is damped such that releasing the locking retainer requires at least about 5 seconds, preferably about 5-10, more preferably 6-10, most preferably 7-10 seconds.

Preferably in one embodiment the locking tongue is a locking bar, the damped locking tongue releasing mechanism comprises a locking plate and a damper (ITT Enidine Inc., NY, NY, US) and the damper is operably connected to the locking plate, and the locking retainer is a slidable pawl configured in a slidable first state to permit the cavity to receive and/or release the locking bar and in a non-slidable second state to retain the locking bar in the cavity, wherein the locking plate is configured to move between a first position when the slidable pawl is in the slidable first state and a second position when the slidable pawl is in the non-slidable second state, wherein the damper is configured to control movement of the locking plate from the second position to the first position such that said movement requires at least about 5 seconds to complete.

Preferably the lock additionally comprises a lock spring which biases the slidable pawl such that the slidable pawl extends into the cavity. When the lock additionally comprises a lock spring, the slidable pawl preferably comprises a lip configured to permit the locking bar to slide over the lip when in the slidable first state and to prevent the locking bar sliding over the lip when in the non-slidable second state. In either case, the locking plate is optionally configured in the first position to permit the lock spring to be compressed by sliding the slidable pawl from the cavity and in the second position to prevent the lock spring being compressed by sliding the slidable pawl from the pocket.

Preferably the locking plate is configured to move from the first position to the second position, i.e., to retain the locking bar in the cavity, at least partly under the effect of gravity. However, in addition to the effect of gravity, an operator, such as a flight attendant, may also manually operate the lock to move the locking plate from the first position to the second position.

Preferably the lock additionally comprises a releasable catch for retaining the locking plate in the first position. The releasable catch is typically operated by a flight attendant. Thereafter, the operator may allow gravity alone to move the locking plate from a first position to a second position or may additionally manually assist such movement.

Preferably the damper is configured to control movement of the locking plate from the second position to the first position, i.e., to release the locking bar from the cavity, such that said movement requires about 5-10, preferably 6-10, most preferably 7-10 seconds.

In a second embodiment of the first aspect of the invention, the locking tongue is a locking pin, preferably a spring loaded locking pin, which engages the cavity thereby locking the lock, and the damped locking tongue releasing mechanism is configured to push the pin out of the cavity thereby unlocking the lock.

In a second aspect of the invention, a barrier, such as a secondary aircraft cockpit barrier, is provided, the barrier comprising a lock according to the first aspect of the invention and a barrier body for blocking access to a part of an aircraft interior such as a cockpit, wherein the locking tongue or bar is operably attached to the barrier body such that the barrier body blocks access to the part of an aircraft interior such as a cockpit when the locking retainer retains the locking tongue in the cavity or the slidable pawl is in the non-slidable second state retaining the locking bar in the cavity.

The barrier body is preferably formed from either a flexible net material or comprises more than one panel foldable one upon the other or more than one panel foldable one upon the other in a zig-zag manner, wherein the more than one panel comprises a frame holding the flexible net material. The flexible net material preferably comprises woven or braided material, preferably the material is a polymer, and preferably the polymer is selected from the group of polymers consisting of polyester, polyethylene including ultra-high molecular weight polyethylene, polypropylene, polyamide and mixtures thereof. The flexible net material preferably comprises more than 70, more preferably more than 90% open area in order to address any rapid decompression event, minimise weight and material for storage, and to maximise visibility for the flight deck crew and flight marshals. In one embodiment, the flexible net material is made from 1-2 mm diameter ultra-high molecular weight polyethylene braid in the form of a diamond or square mesh.

The barrier body comprising more than one panel is preferably deployed using a roller and track mechanism where rollers fixed to opposite sides of each panel are guided in tracks affixed to either side or the floor and ceiling of the access to, for example, the flight deck or other part of the aircraft interior from an adjacent galley. The track is typically formed from aluminium or aluminium alloy.

The secondary aircraft cockpit barrier optionally additionally comprises a spindle upon which the barrier body formed from the flexible net material is wound in the form of a roll, and a barrier spring operably attached to the spindle, the spindle spring biased to maintain the barrier body on the spindle thereby placing the barrier body under tension when the locking retainer retains the locking tongue in the cavity or the slidable pawl is in the non-slidable second state retaining the locking bar in the pocket. In order to save weight whilst maintaining strength, the spindle is typically formed from aluminium or an aluminium alloy. Preferably the spindle is housed in a removable spindle housing, typically formed from aluminium or an aluminium alloy, and/or polycarbonate. The spindle housing prevents the spindle from bending (and hence releasing its ends and coming loose) should a passenger attempt to breach the barrier body by force such as by ramming it, rather than unlocking the lock. Should the barrier body become jammed on the spindle, the spindle housing can be removed in order to free the jam. The spindle spring is biased to not only maintain the barrier body under tension when it is in use but also to assist retraction of the barrier body onto the spindle after use.

One embodiment of the barrier, in the form of a secondary aircraft cockpit barrier, may be used as followed:

1) A member of the flight deck crew alerts a passenger cabin assistant that they intend to leave the cockpit.
2) The cabin assistant pulls across the barrier body across the access from the galley to the flight deck.
3) The cabin assistant presents the locking tongue or bar to the cavity and the locking retainer retains the locking tongue in the cavity or the spring loaded slidable pawl accepts the locking bar and springs back keeping the locking bar in place against the tension of the spring loaded spindle.
4) The cabin assistant releases the releasable catch enabling the locking plate controlled by the damper to move from a first position to a second position engaging the locking plate thereby preventing further movement of the locking pawl.
5) The cabin assistant informs the flight deck it is safe to exit.
6) The flight deck crew member uses the toilet facilities and then returns to the flight deck.
7) After the flight deck crew member has safely returned to the flight deck and secured the cockpit door, the cabin assistant operates the damped locking tongue releasing mechanism to release the locking retainer thereby unlocking the locking tongue from the cavity or forces the locking plate (typically through operation of a lever) against the resistance of the damper fluid in the damper from the second position preventing movement of the locking pawl to the first position where the locking pawl can move, which action takes a minimum of 5 seconds.
8) When the locking plate has reached the first position, the locking plate is no longer engaged with the locking pawl and the locking bar can be released from the cavity and the barrier body roll back onto the spindle under tension from the spindle spring.
9) The releasable catch finds its location and holds the locking plate in place and the sequence repeats when applicable.

If a passenger attempts to simulate the same operation as the cabin assistant whilst the door to the flight deck is momentarily open, the flight deck crew member still has at least 5 seconds in order to secure the flight deck because the time delay for unlocking the secondary aircraft cockpit barrier remains constant regardless of the force applied to the lever operating the locking plate thereby.

Example 1

FIG. 1A illustrates a horizontal cross-section of one embodiment of the invention and shows the lock (101) (save the locking bar) fixed to one side of an access between an aircraft galley and flight deck and the locking bar (102) and barrier body (103) fixed to the opposing side of the access. The locking bar is held in the cavity (104) by the sliding pawl (105). The sliding pawl is biased into the cavity by the leaf spring (106). In FIG. 1A, movement of the leaf spring is prevented by the locking plate (107).

Figure 1B:
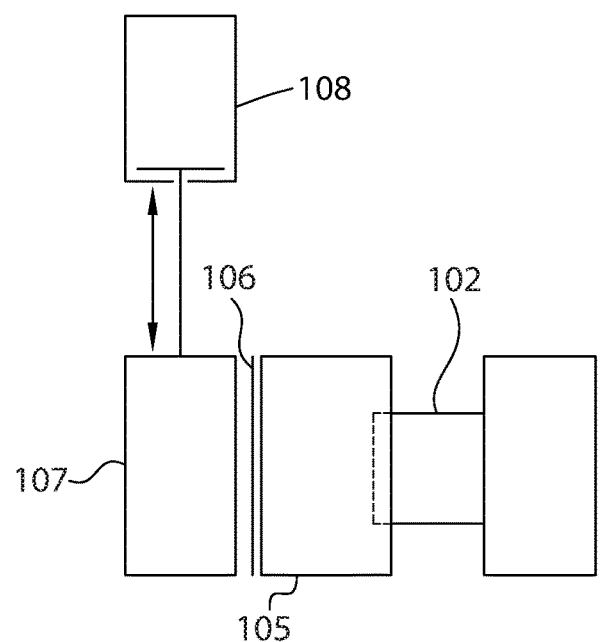

FIG. 1B illustrates a vertical cross-section of the embodiment of FIG. 1A showing the damper (108) operably attached to the locking plate such that the locking plate may raise from and fall behind the leaf spring. The sliding pawl comprises a lip (109) (shown in FIG. 1A). When the locking plate has been raised from behind the leaf spring, the sliding pawl may be pushed out of the cavity as the locking bar enters (and leaves) the cavity, and as the locking bar passes over the lip, the sliding pawl partially springs back under the spring biase. When the locking plate falls behind the leaf spring, the sliding pawl is locked in place and the lip then prevents the locking bar from being released from the cavity.

Example 2

Figure 2:
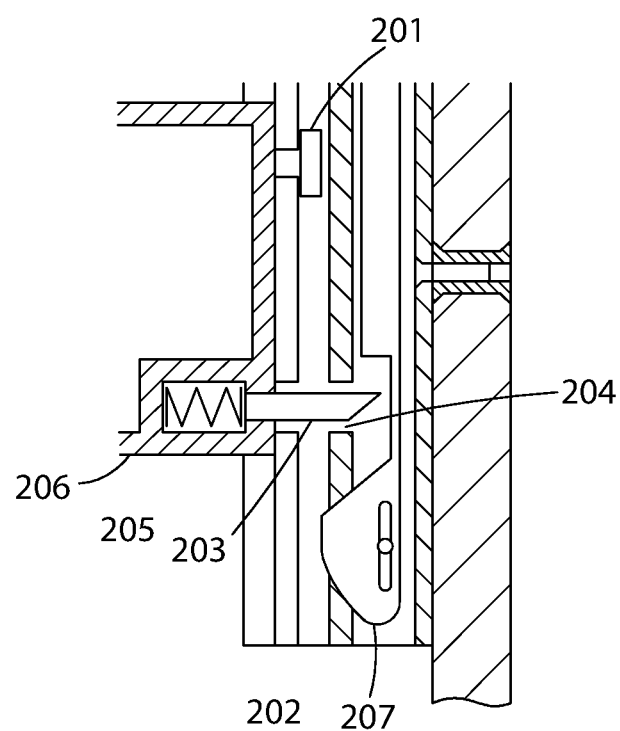
FIG. 2 a vertical cross-section of another embodiment of the barrier of the invention.

FIG. 2 illustrates a vertical cross-section of the second embodiment of the invention comprising a barrier body comprising more than one panel deployed using a roller (201) and track (202) mechanism with rollers fixed to opposite sides of each panel guided in tracks affixed to either side of the access to the flight deck from the galley. The locking pin (203) is biased into the cavity (204) by the spring (205). The locking pin is attached to the barrier body (206) and the cavity is formed in the track. The damped locking tongue releasing mechanism comprises a damper (not shown) operably connected to a locking tongue releasing tool (207). In this embodiment, the barrier body is pulled down from the ceiling and is locked when the locking pin (203) aligns with the cavity (204). In order to release the locking pin from the cavity, the locking tongue releasing tool is raised against the damper. The shapes of the locking tongue releasing tool and the locking pin are configured so that, on contact between the locking tongue releasing tool and the locking pin, the locking pin is gradually pushed out of the cavity and the barrier body is then free to be raised to the ceiling either under spring bias and/or manually.

The invention claimed is:

1. A lock for a secondary aircraft cockpit barrier, the lock comprising:
   a locking tongue, which is a locking bar;
   a cavity for receiving the locking tongue;
   a locking retainer for retaining the locking tongue in the cavity, the locking retainer being a slidable pawl configured in a slidable first state to permit the cavity to receive and/or release the locking bar and in a non-slidable second state to retain the locking bar in the cavity; and
   a damped locking tongue releasing mechanism for releasing the locking retainer, thereby unlocking the locking tongue from the cavity, and comprising a locking plate and a damper that is operably connected to the locking plate, the locking plate being configured to move between a first position when the slidable pawl is in the slidable first state and a second position when the slidable pawl is in the non-slidable second state,
   wherein the damped locking tongue releasing mechanism is damped such that releasing the locking retainer requires at least about 5 seconds, and
   wherein the damper is configured to control movement of the locking plate from the second position to the first position such that the movement requires at least about 5 seconds to complete.

2. The lock according to claim 1, wherein the lock additionally comprises a lock spring which biases the slidable pawl such that the slidable pawl extends into the cavity.

3. The lock according to claim 2, wherein the slidable pawl comprises a lip configured to permit the locking bar to slide over the lip when in the slidable first state and to prevent the locking bar sliding over the lip when in the non-slidable second state.

4. The lock according to claim 2, wherein the locking plate is configured in the first position to permit the lock spring to be compressed by sliding the slidable pawl from the cavity and in the second position to prevent the lock spring being compressed by sliding the slidable pawl from the cavity.

5. The lock according to claim 1, wherein the locking plate is configured to move from the first position to the second position at least partly under the effect of gravity.

6. The lock according to claim 1, wherein the lock additionally comprises a releasable catch for retaining the locking plate in the first position.

7. The lock according to claim 1, wherein the damper is configured to control movement of the locking plate from the second position to the first position such that the movement requires about 5-10 seconds.

8. A barrier comprising:
   the lock according to claim 1; and
   a barrier body for blocking access to part of an aircraft interior,
   wherein the locking tongue or bar is operably attached to the barrier body such that the barrier body blocks access to part of the aircraft interior when the locking retainer retains the locking tongue in the cavity or the slidable pawl is in the non-slidable second state retaining the locking bar in the cavity.

9. The barrier according to claim 8,
   wherein the barrier body is formed from a flexible net material, comprises more than one panel foldable one upon the other, or comprises more than one panel foldable one upon the other in a zig-zag manner, and
   wherein the more than one panel comprises a frame holding the flexible net material.

10. The barrier according to claim 9, further comprising:
    a spindle upon which the barrier body formed from the flexible net material is wound; and
    a spindle spring operably attached to the spindle,
    wherein the spindle spring is biased to maintain the barrier body on the spindle, thereby placing the barrier body under tension when the locking retainer retains the locking tongue in the cavity or the slidable pawl is in the non-slidable second state retaining the locking bar in the cavity.

11. The lock according to claim 1, wherein the damper is configured to control movement of the locking plate from the second position to the first position such that the movement requires about 6-10 seconds.

12. The lock according to claim 1, wherein the damper is configured to control movement of the locking plate from the second position to the first position such that the movement requires about 7-10 seconds.

* * * * *